(12) United States Patent
Fukumoto

(10) Patent No.: US 7,233,509 B2
(45) Date of Patent: *Jun. 19, 2007

(54) PARALLEL OPERATING SYSTEM OF DC-AC CONVERTERS AND CONTROLLER IC THEREFOR

(75) Inventor: Kenichi Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,321

(22) Filed: Aug. 12, 2005

(65) Prior Publication Data

US 2006/0187690 A1    Aug. 24, 2006

Related U.S. Application Data

(62) Division of application No. 10/505,061, filed on Aug. 19, 2004, now Pat. No. 6,982,886.

(30) Foreign Application Priority Data

Dec. 25, 2002    (JP)    ............... 2002-373748

(51) Int. Cl.
  *G05F 7/48* (2006.01)
(52) U.S. Cl. ...................................... 363/72
(58) Field of Classification Search .............. 363/65, 363/71, 72, 131, 132; 307/82
  See application file for complete search history.

(56) References Cited

U.S. PATENT DOCUMENTS

| | | | | |
|---|---|---|---|---|
| 5,193,054 A | 3/1993 | Galloway et al. | ............. | 363/72 |
| 5,257,180 A * | 10/1993 | Sashida et al. | ................ | 363/71 |
| 5,434,771 A | 7/1995 | Danby et al. | .................. | 363/71 |
| 5,473,528 A | 12/1995 | Hirata et al. | ................... | 363/71 |
| 5,640,313 A | 6/1997 | Takehara et al. | .............. | 363/97 |
| 6,134,123 A * | 10/2000 | Yamada | .................... | 363/21.13 |
| 6,259,615 B1 | 7/2001 | Lin | | |
| 6,381,157 B2 | 4/2002 | Jensen | ......................... | 363/71 |
| 6,396,722 B2 | 5/2002 | Lin | | |
| 6,778,412 B2 * | 8/2004 | Nagai et al. | ................... | 363/53 |
| 6,982,886 B2 * | 1/2006 | Fukumoto | .................... | 363/72 |
| 6,982,889 B2 * | 1/2006 | Fukumoto | .................... | 363/98 |
| 7,046,526 B2 * | 5/2006 | Toda et al. | .................... | 363/24 |
| 7,095,635 B2 * | 8/2006 | Fukumoto | ................ | 363/21.09 |
| 7,099,168 B2 * | 8/2006 | Fukumoto | .................... | 363/98 |

FOREIGN PATENT DOCUMENTS

JP    5-80191    10/1993

(Continued)

*Primary Examiner*—Adolf Berhane
(74) *Attorney, Agent, or Firm*—Hogan & Hartson LLP

(57) ABSTRACT

A multiplicity of synchronized inverters for driving a multiplicity of loads such as CCFLs that require high ac voltages are arranged in close proximity of the respective loads and controlled in phase. A frequency determination capacitor and a frequency determination resistor are connected to one of the inverters to generate a triangular wave signal and a clock signal. The triangular wave signal and clock signal thus generated are supplied to other inverters to synchronize all the loads so that they can be controlled in phase. The resistance of the frequency determination resistor is set to a substantially small magnitude at the time of startup to increase the frequency of the triangular wave signal, thereby enabling quick startup of the loads.

5 Claims, 5 Drawing Sheets

FOREIGN PATENT DOCUMENTS

| | | |
|---|---|---|
| JP | 8-111290 | 4/1996 |
| JP | 10-050489 | 2/1998 |
| JP | 2000-306692 | 11/2000 |
| JP | 2001-110582 | 4/2001 |
| JP | 2002-43088 | 2/2002 |
| TW | 478240 | 3/2002 |

* cited by examiner

PARALLEL OPERATING SYSTEM OF DC-AC CONVERTERS AND CONTROLLER IC THEREFOR

This is a divisional of application Ser. No. 10/505,061 filed Aug. 19, 2004, now U.S. Pat. No. 6,982,886 which application is hereby incorporated by reference in its entirety.

TECHNICAL FIELD

The invention relates to a system of dc-ac converters operating in parallel for converting a dc voltage of such power supply as a power supply adapter and a battery of an electric apparatus into an ac voltage for driving loads (the converters hereinafter referred to as inverters). The invention also relates to controller IC for use with such inverters.

BACKGROUND ART

A cold cathode fluorescent light (CCFL) has been increasingly used as a backlight source of a liquid crystal display (LCD) monitor of a notebook PC and of an LCD for use with a TV set. Such CCFL has substantially the same high efficiency and long life as a usual hot cathode fluorescent light, without using a filament implemented in the hot cathode fluorescent light.

The CCFL requires a high startup voltage and a high operating voltage. For example, a startup voltage of about 1000 V and an operating voltage of about 600 V are required. These high ac voltages are generated from a dc power supply of, for example, a notebook PC and a liquid crystal TV set, using an inverter.

Conventionally, a Royer circuit has been used as an inverter for the CCFL. The Royer circuit comprises a saturable magnetic core transformer and a control transistor, and is adapted to undergo a self-sustaining oscillation because of nonlinear permeability of the saturable magnetic core and nonlinear current gain characteristic of the control transistor. The Royer circuit itself requires no external clock or driver circuit.

However, a Royer circuit is basically a constant voltage inverter, which cannot provide a constant output voltage if the input voltage thereto and/or the load current thereof varies. Hence, in order to maintain a constant input voltage to the Royer circuit, a regulator for supplying electric power to the Royer circuit is required. For this reason, besides the inverter utilizing a Royer circuit has low power inversion efficiency, it is difficult to miniaturize such inverter.

A CCFL inverter having improved power conversion efficiency has been disclosed (see for example Japanese Patent Early Publication H10-50489). This inverter comprises a first semiconductor switch connected in series with the primary winding of a transformer, a second semiconductor switch and a capacitor which are connected in series with each other and in parallel with the primary winding, and a coupling capacitor connected in series with the secondary winding of the transformer and with the load. The primary current of the transformer is fed back to a control circuit for comparison with a reference voltage to establish a control signal, which signal is used to control on-off operation of the first and second semiconductor switches to provide a predetermined ac power to the load.

A full bridge type CCFL inverter (also called H bridge type inverter) utilizing four semiconductor switches has been also proposed (see for example U.S. Pat. No. 6,259,615). This inverter utilizes a transformer having a primary winding connected to the output terminal of the H bridge via a resonant capacitor connected in series with the primary winding. The load is connected to the secondary winding of the transformer. Of the four semiconductor switches constituting the H bridge, a first set of two semiconductor switches establishes a current path in a first direction to the primary winding of the transformer and a second set of two semiconductor switches establishes a current path in a second direction to the primary winding. By feeding the secondary current back to a control circuit for comparison of the voltage indicative of the current with a reference voltage, a control signal having a fixed pulse-width and controlled relative pulse position is generated. The control signal is provided to the semiconductor switches of the H bridge to thereby regulate the power supplied to the load. Further, the voltage across the secondary winding of the transformer is detected to secure over-voltage protection.

A multiplicity of distributed CCFLs have been increasingly used as a backlight source for a big-sized LCD (liquid crystal display) monitor of a notebook PC and LCD television receiver set. In this case, light beams from the multiple CCFLS can accompany flickering if the light beams interfere one another. In order to avoid this flickering, it is necessary to turn on the CCFLs in phase.

To do this, an inverter is often constructed in discrete circuits to provide large output power so that ac power is supplied to the multiple CCFLs in phase.

However, in order to supply the output power of one inverter to a multiplicity of distributed CCFLs, high voltage power lines must be wired around. The high voltage power lines to the CCFLS are preferably as short as possible since the power lines result in electromagnetic influence on the rest of the inverters. The power lines to the CCFLs are preferably as short as possible to take advantage of parasitic capacitance of each CCFL in establishing resonant oscillation with the inductance of a transformer. For these reasons, the inverters controlling the CCFLs are preferably arranged in as close proximity as possible to the respective CCFLs.

It is, therefore, an object of the present invention to provide a parallel operating system of a multiplicity of inverters for driving a multiplicity of loads, such as CCFLs requiring a high voltage, the inverters arranged in close proximity of the respective loads and the system being capable of controlling the inverters in phase. It is another object of the invention to provide a controller IC for such parallel operating system.

SUMMARY OF THE INVENTION

The invention provides a multiplicity (N) of dc-ac converters each comprising:

a transformer having a primary winding and at least one secondary winding connected to a load;

a semiconductor switch circuit for flowing current from a dc power supply to the primary winding in a first direction and a second direction alternately;

a current detection circuit for detecting the current flowing through the load and generating a current detection signal;

an oscillator block for generating a triangular wave signal and a clock signal synchronized with the triangular wave signal when connected to a frequency determination capacitor and a frequency determination resistor; and a PWM control circuit for providing the semiconductor switch circuit with a PWM-controlled switch drive signal upon receipt of the triangular wave signal, clock signal, and current detection signal, wherein the system is adapted to:

allow the frequency determination capacitor and frequency determination resistor to be connected to only one of the N dc-ac converters to generate the triangular wave signal and the clock signal from the oscillator block associated with the one dc-ac converter; and supply the triangular wave signal and the clock signal generated by the one dc-ac converter to the rest of the N dc-ac converters, whereby the N dc-ac converters are synchronized to the clock signal in performing in-phase PWM control of the N dc-ac converters.

The invention also provides a controller IC adapted to control the ac power to be supplied to a load by driving a semiconductor switch circuit, the controller IC comprising:

an oscillator block for generating a triangular wave signal and a clock signal synchronized with the triangular wave signal when connected to a frequency determination capacitor and a frequency determination resistor;

a PWM control circuit for providing the semiconductor switch circuit with a PWM-controlled switch drive signal upon receipt of the triangular wave signal and clock signal and the current detection signal obtained by detecting the current flowing through the load;

a first external terminal connected to the frequency determination capacitor and adapted to serve as an output terminal when the triangular wave signal is generated, but serve as an input terminal for receiving an external triangular wave signal when the triangular wave signal is not generated;

a second external terminal connected to the frequency determination resistor; and a third external terminal adapted to serve as an output terminal when the clock signal is generated, but serve as an input terminal when the clock signal is not generated, wherein the triangular wave signal is also outputted from the first external terminal and the clock signal is outputted from the third external terminal when the frequency determination capacitor is connected to the first external terminal and the frequency determination resistor is connected to the second external terminal; and the triangular wave signal is externally inputted to the first external terminal and the clock signal is externally inputted to the third external terminal when the frequency determination resistor is not connected to the external terminal.

The triangular wave signal and clock signal generated in the oscillator block may have the same frequency; and the dc-ac converter generating the triangular wave signal may be adapted to generate a synchronization signal having a stepped-down frequency and supply the synchronization signal to the rest of the N dc-ad converters for use in common for synchronization thereof. In addition, the synchronization signal may have a stepped-down frequency obtained by frequency-dividing the clock signal by 2.

The oscillator block may comprise a mode circuit for determining whether the frequency determining resistor is connected thereto or not and outputting the determination; and an oscillator circuit that is enabled or disabled in accordance with the determination received from the mode circuit.

The triangular wave signal may be provided at the node to which the frequency determination capacitor is connected, or a triangular wave signal generated by another dc-ac converter is supplied.

The resistance of the frequency determination resistor may be set to a low magnitude when the N dc-ac converters are started up, and set to a larger magnitude subsequently.

The load may be a cold cathode fluorescent light.

In accordance with the invention, the multiplicity of inverters driving multiple loads such as CCFLs requiring a high operating voltage are arranged in close proximity of the respective loads. A frequency determination capacitor and a frequency determination resistor are connected to one of the inverters to generate a triangular wave signal and a clock signal. The triangular wave signal and clock signal thus generated are supplied to other inverters to synchronize all the loads so that they can be operated in phase.

At the time of startup, the resistance of the frequency determination resistor is set to a substantially small magnitude to increase the frequency of the triangular wave signal, thereby enabling simultaneous quick startup of the multiple loads.

The same controller ICs may be used in the inverters, with the terminals of the controller ICs having the same function connected together, and only the primary controller IC undergoing oscillation, thereby simplifying the structure of the entire inverter system. It is noted that the loads are not limited in number.

BEST MODE FOR CARRYING OUT THE INVENTION

An parallel operating system of a multiplicity of inverters generating an ac voltage to drive a multiplicity of loads from a dc supply voltage in accordance with one aspect of the invention will now be described in detail, along with a controller IC therefor, with reference to the accompanying drawings.

Figure 1:
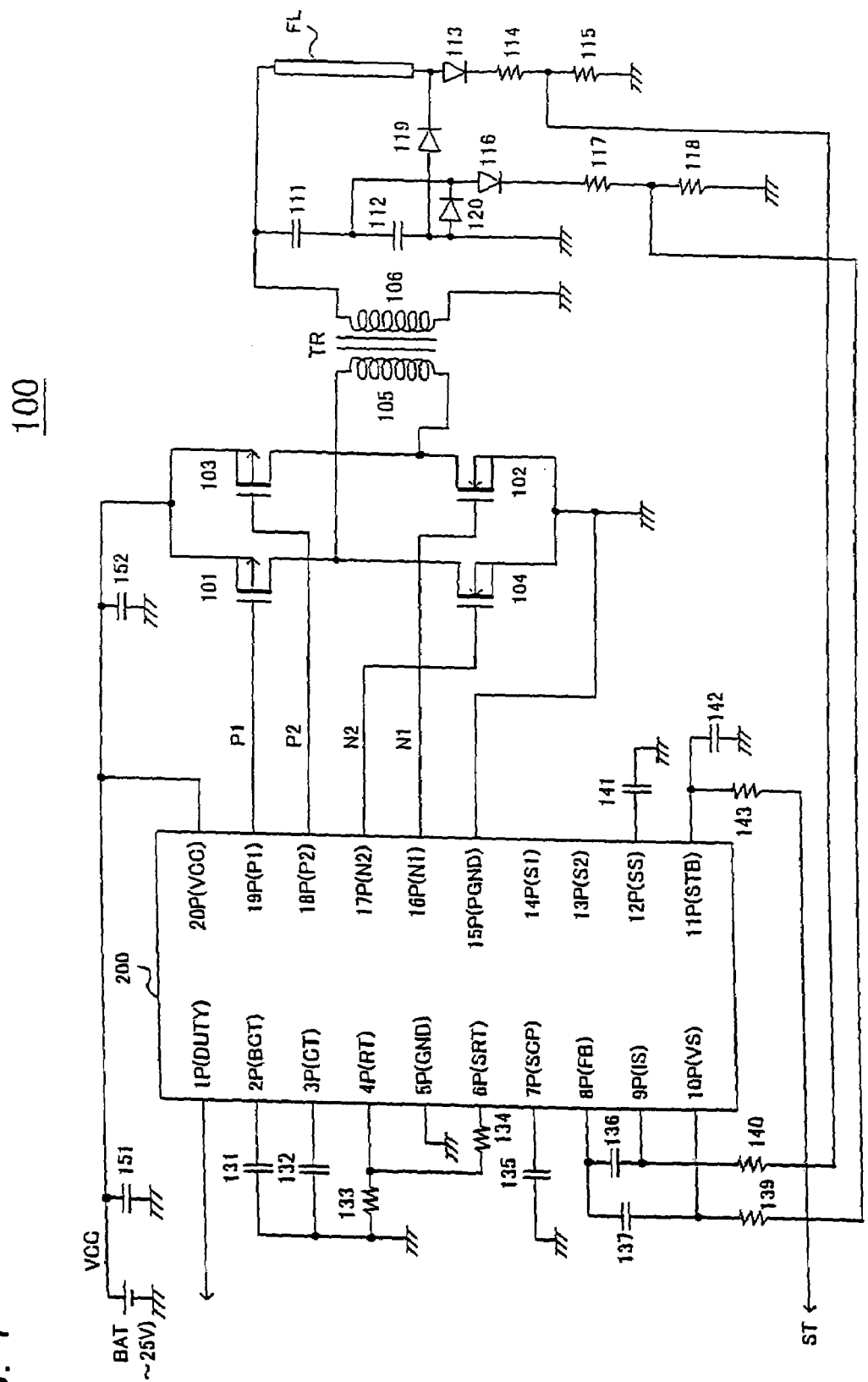
FIG. 1 is a schematic diagram showing an overall arrangement of an inverter in accordance with the invention.
Figure 2:
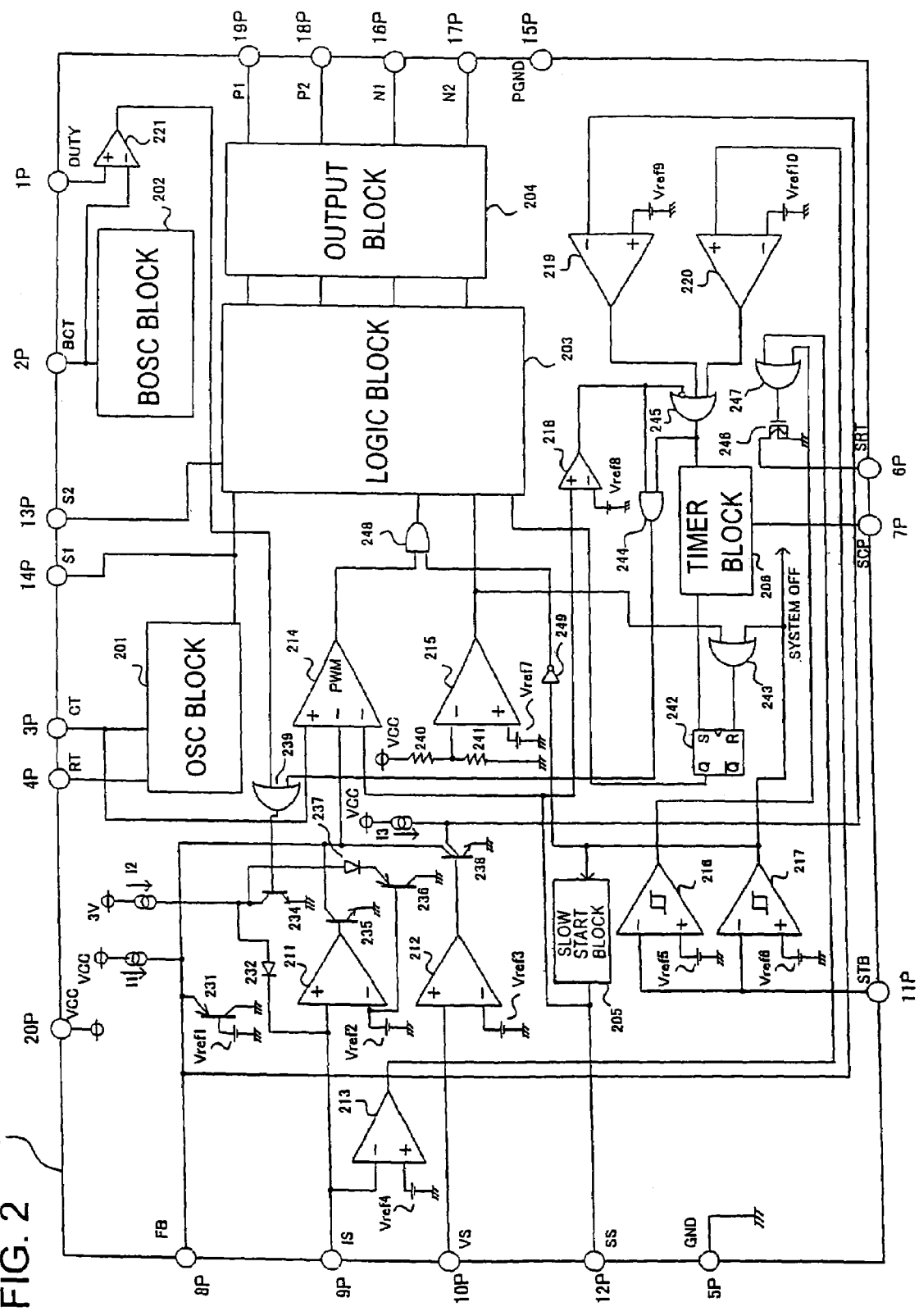
FIG. 2 is a schematic diagram showing an internal structure of a controller IC for use in the inverter of FIG. 1.

Referring to FIG. 1, there is shown an overall arrangement of an inverter 100 in accordance with a first embodiment of the invention, in which PWM control of the ac power is effected using an insulated transformer and a full bridge type switch circuit. FIG. 2 shows an internal structure of a controller IC (that is, an IC for controlling the inverter) 200 for use in the inverter.

As shown in FIG. 1, a first switch in the form of a P-type MOSFET (hereinafter referred to as PMOS) 101 and a second switch in the form of an N-type MOSFET (hereinafter referred to as NMOS) 102 constitute a first current path in a first direction from a dc power supply to the primary winding 105 of a transformer TR. A third switch in the form of a PMOS 103 and a fourth switch in the form of NMOS 104 constitute a second current path in a second direction from the dc power supply to the primary winding 105 of the transformer TR. Each of these PMOSs 101 and 103 and NMOSs 102 and 104 have a body diode (or back gate diode). With these body diodes, current can be passed in the second direction opposite to the first. Additional diodes may be provided to fulfill the same function as the body diodes.

The primary winding 105 of the transformer TR is supplied with a power supply voltage VCC from a dc power supply BAT through PMOSs 101 and 103 and NMOSs 102 and 104 to induce a high voltage across a secondary winding 106 of the transformer TR in accordance with the winding ratio of the primary to the secondary winding. The induced high voltage is supplied to a cold cathode fluorescent light FL to turn it on.

Capacitors 111–112 and resistors 117–118 are provided to detect the voltage impressed on the cold cathode fluorescent light FL and feed the detected voltage back to a controller IC 200. Resistors 114–115 are provided to detect the current that flows through the cold cathode fluorescent light FL and feed it back to the controller IC 200. The capacitor 111 is adapted to resonate with the inductive transformer TR. The capacitance of the cold cathode fluorescent light FL also contributes to the resonance. Elements numbered 113, 116, 119, and 120 are diodes. Elements numbered 151 and 152 are capacitors provided to stabilize the power supply voltage.

The controller IC 200 has a multiplicity of input-output (I/O) pins. A first pin 1P is a mode switching terminal for switching operational mode between PWM mode and intermittent operation mode (hereinafter referred to as burst mode). The first pin 1P is supplied with a duty signal DUTY for switching the operation mode and for determining the duty cycle ratio during the burst mode. A second pin 2P is a terminal (capacitive connection terminal) for connection with the capacitor 131 of a burst mode oscillator (BOSC). The second pin 2P is connected to the capacitor 131 to generate across the capacitor a triangular wave signal (i.e. triangular wave signal train) BCT for initiating a burst. The triangular wave signal will hereinafter be referred to as burst triangular wave signal.

A third pin 3P is a terminal for connection with a capacitor 132 (referred to as frequency setting capacitor) for establishing an oscillation frequency of a PWM mode oscillator (OSC). A triangular wave signal (i.e. triangular wave signal train) CT for PWM (referred to as PWM triangular wave signal) is generated at the third pin 3P connected to the capacitor 132. A fourth pin 4P is a terminal for connection with a resistor (referred to as frequency determination resistor) 133 for setting up a charge current to the third pin 3P. The fourth pin 4P has a potential RT, which causes a current to flow through the resistor 133 connected thereto in accord with the potential lift and the resistance of the resistor 133. A fifth pin 5P is an earth terminal having ground potential GND.

A sixth pin 6P is a terminal (referred to as resistance setting terminal) for connection with a resistor (referred to as startup resistor) 134 to set up a charging current passed to the third pin 3P. The charge current setting resistor 134 connected to the sixth pin 6P is connected in parallel with the resistor 134 or disconnected therefrom, under the control of an internal circuit of the controller IC 200. The sixth pin 6P has a potential SRT, which equals either the ground potential GND or the potential RT of the fourth pin 4P. A seventh pin 7P is a terminal for connection with a capacitor 135 for setting a timer latch. The capacitor 135 when connected to the seventh pin 7P stores a charge, developing a voltage SCP in accord with the charge. The capacitor 135 determines the time limit of protective action to protect the internal circuit of the controller IC 200.

A ninth pin 9P is an input terminal of a first error amplifier. The ninth pin 9P is fed, via a resistor 140, a current detection signal (referred to as detection current) IS in accord with the current flowing through the cold cathode fluorescent light FL. The detection current IS is inputted into the first error amplifier. An eighth pin 8P is an output terminal of the first error amplifier. Connected between the eighth pin 8P and the ninth pin 9P is a capacitor 136. The potential of the eighth pin 8P serves as feedback control voltage FB for the PWM control. In what follows the ground potential is taken as a reference for voltages unless otherwise stated.

A tenth pin 10P is an input terminal of a second error amplifier. The tenth pin 10P is fed via a resistor 139 with a voltage detection signal (hereinafter referred to as detection voltage) VS in accord with the voltage impressed on the cold cathode fluorescent light FL. The detection voltage VS is inputted into the second error amplifier. Connected between the tenth pin 10P and the eighth pin 8P is a capacitor 137.

An eleventh pin 11P is a terminal for setting starting time and for starting up the inverter. A signal STB is derived from a delayed startup signal ST by removing the noise therefrom by means of a resistor 143 and a capacitor 142, and is supplied to an eleventh pin 11P. A twelfth pin 12P is a terminal for connection with a grounded capacitor 141 for setting slow-start time. A slow-start voltage SS gradually develops across the capacitor 141 during a startup.

A thirteenth pin 13P is a synchronization terminal to be connected to another controller IC when the controller 200 is to be synchronized therewith. A fourteenth pin 14P is an I/O terminal of the internal clock, for connection with another controller IC when the controller 200 is to collaborate with said another controller.

A fifteenth pin 15P is an earth terminal for an external FET drive circuit. A sixteenth pin 16P is a terminal for outputting, a gate drive signal N1 of the NMOS 102. A seventeenth pin 17P is a terminal for outputting a gate drive signal N2 of the NMOS 104. An eighteenth pin 18P is a terminal for outputting a gate drive signal P2 of the PMOS 103. A nineteenth pin 19P is a terminal for outputting a gate drive signal P1 of the PMOS 101. A twentieth pin 20P is a power supply terminal for receiving the power supply voltage VCC.

As shown in FIG. 2 illustrating the internal structure of the controller IC 200, an oscillation (OSC) block 201 generates a PWM triangular wave signal CT having a period of cycle determined by the capacitor 132 connected to the third pin 3P and the resistors 133–134 connected to the fourth pin 4P, and supplies the signal CT to a PWM comparator 214. The oscillator block 201 also generates an internal clock and supplies it to a logic block 203.

A BOSC oscillator block 202 is an oscillator circuit (hereinafter referred to as burst triangular wave signal generation circuit) for generating a burst triangular wave signal BCT having a frequency determined by the capacitor 131 connected to the second pin 2P. The frequency of the burst triangular wave signal BCT is set much lower than the frequency of the PWM triangular wave signal CT (i.e. BCT frequency<CT frequency). The dc voltage supplied to the first pin 1P (that is, analog duty signal DUTY) is compared with the burst triangular wave signal BCT in a comparator 221. The output of the comparator 221 is used to drive an NPN transistor (hereinafter referred to as NPN) 234 via an OR circuit 239. In a case where a digital (PWM) duty signal DUTY is supplied to the first pin 1P, a resistor is connected to the second pin 2P to output a predetermined burst voltage from the BOSC block 202.

The logic block 203 is supplied with a PWM control signal, for example, to generate a switch drive signal in accord with a predetermined logic. An output block 204 generates gate drive signals P1, P2, N1, and N2, in accord with the switch drive signal received from the logic block 203, and supplies them to the respective gates of the PMOSs 101 and 103 and NMOSs 102 and 104.

A slow start block 205 is started up by the output of a comparator 217 when the startup signal ST is supplied and the signal STB inputted to the comparator 217 is raised slowly by the capacitor 142 and resistor 143 above a reference voltage Vref6. The output of the comparator 217 enables the logic block 203. A circuit 249 is an inversion circuit. The output of the comparator 217 resets a flip-flop (FF) circuit 242 via an OR circuit 243. As the start block 205 is started up, the slow-start voltage SS gradually rises, which is inputted to the PWM comparator 214 as a comparison input. Thus, at the time of startup, PWM control is executed by the slow-start voltage 85.

It is noted that during a startup, the comparator 216 turns off an NMOS 246 via an OR circuit 247 when the input voltage to the comparator 216 exceeds a reference voltage Vref5. This causes the resistor 134 to be separated from the controller IC 200, and the frequency of the PWM triangular wave signal CT to be changed. The OR circuit 247 is also fed the output of a comparator 213.

A first error amplifier 211 compares the detection current IS that is proportional to the current through the cold cathode fluorescent light FL with a reference voltage Vref2 (which is, for example, 1.25 V), and generates an output in accord with the error between them to control an NPN 235 connected to a constant current source 11. The collector of the NPN 235 is connected to the eighth pin 8P. Thus, the potential of the node (i.e. the eighth pin 8P) serves as the feedback voltage FB to be inputted as a comparison input to the PWM comparator 214.

The PWM comparator 214 compares the triangular wave signal CT with the lower one of the feedback voltage FB and the slow-start voltage SS to generate and provide PWM control signals to the logic block 203 via an AND circuit 248. Under a steady state condition reached subsequent to a startup, a triangular wave signal CT is compared with the feedback voltage FB for automated control of the current flowing through the cold cathode fluorescent light FL at a preset level.

Because the capacitor 136 is connected between the eighth pin 8P and the ninth pin 9P, the feedback voltage FB increases and. decreases smoothly. As a consequence, the PWM control is carried out smoothly, without an abrupt change.

A second error amplifier 212 compares the detection voltage VS that is proportional to the voltage across the cold cathode fluorescent light FL with a reference voltage Vref3 (which is 1.25 V, for example) to generate an output voltage indicative of the difference between them. This output is used to control a double collector type NPN 238 having one end connected to the constant current source 11. Since the collector of the NPN 238 is also connected to the pin 8P, the feedback voltage FB is also controlled by the detection voltage VS. As a consequence, the comparator 212 and the NPN 238 together constitute a feedback signal control circuit for controlling the feedback signal FB.

Incidentally, if the feedback voltage FB exceeds a reference voltage Vref1 (e.g. 3 V), a PNP transistor (hereinafter referred to as PNP) 231 will be turned on to limit a further excessive rise of the feedback voltage FB.

A comparator 215 compares the power supply voltage VCC with the voltage generated by dividing the power supply voltage VCC by resistors 240 and 241 and with a reference voltage Vref7 (e.g. 2.2 V), and, when the power supply voltage VCC reaches a predetermined level, inverts its output to reset the FF circuit 242 via the OR circuit 243.

A comparator 218 compares the slow-start voltage SS with a reference voltage Vref8 (e.g. 2.2 V) to turn on the NPN 234 via an AND circuit 244 and an OR circuit 239 when the voltage SS exceeds the reference voltage Vref8. The NPN 234, when turned ON, causes a diode 232 to be reversely biased by a current source 12 and hence enables the first error amplifier 211 to perform its normal operation. Thus, the NPN 284, diode 232, and the current source 12 constitute a control mode switching circuit for switching the control mode between burst control and pulse width control mode. A diode 237 and a PNP 236 are provided to suppress an excess voltage.

When the NPN 238 having the other one of the double collectors connected to a constant current source 13 is turned ON by the second error amplifier 212, its collector voltage lowers below a reference voltage Vref9 (e.g. 3 V). This causes the output voltage of a comparator 219 to be reversed. A comparator 220 compares the feedback voltage FB with a reference voltage Vref10 (e.g. 3 V), and inverts its output voltage when the feedback voltage FB exceeds the reference voltage Vref10. The outputs of the comparators 219 and 220 are inputted, along with the inverted output of the comparator 218, to a timer block 206 via an OR circuit 245. The timer allows the inverted signal to be outputted after a predetermined time later. The output of this timer block 206 is supplied to the FF 242 to set it, the Q output of which in turn disables the logic block 203.

Figure 3:
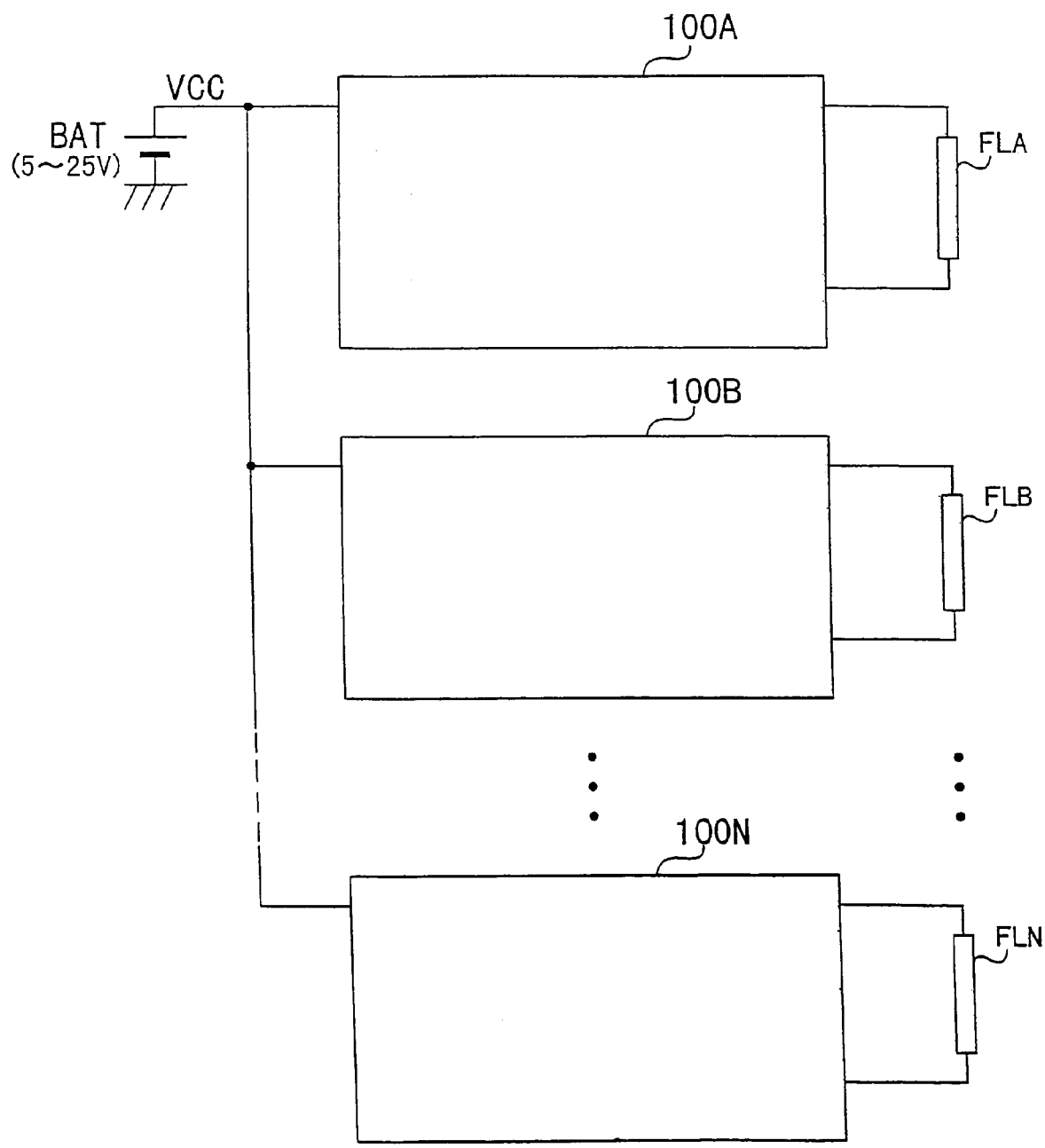
FIG. 3 is a schematic diagram showing an overall arrangement of a parallel operating system of inverters in accordance with the invention.
Figure 4:
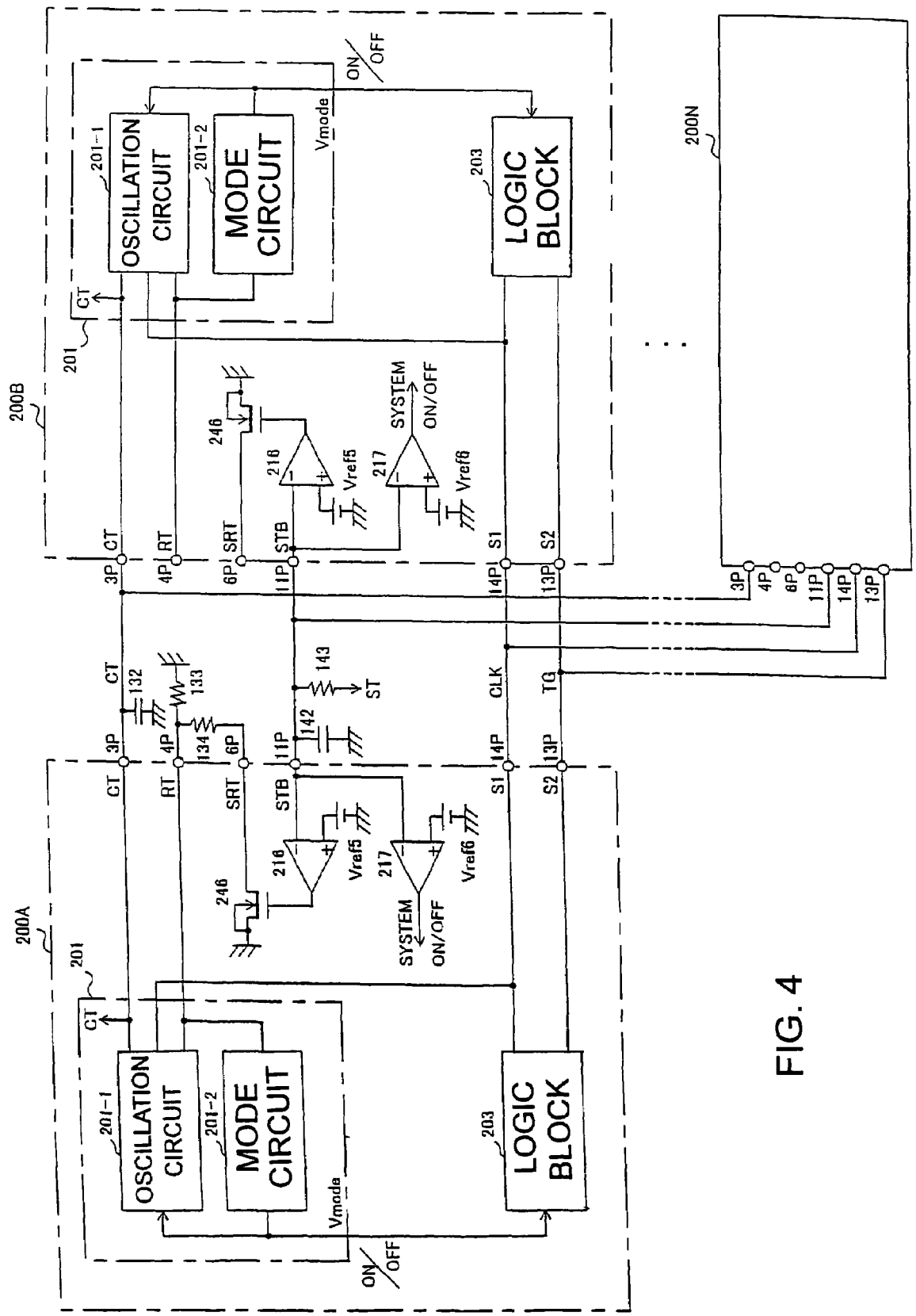
FIG. 4 is a schematic diagram showing a section of the parallel operating system of FIG. 3 involved in the parallel operation of the inverters.
Figure 5:
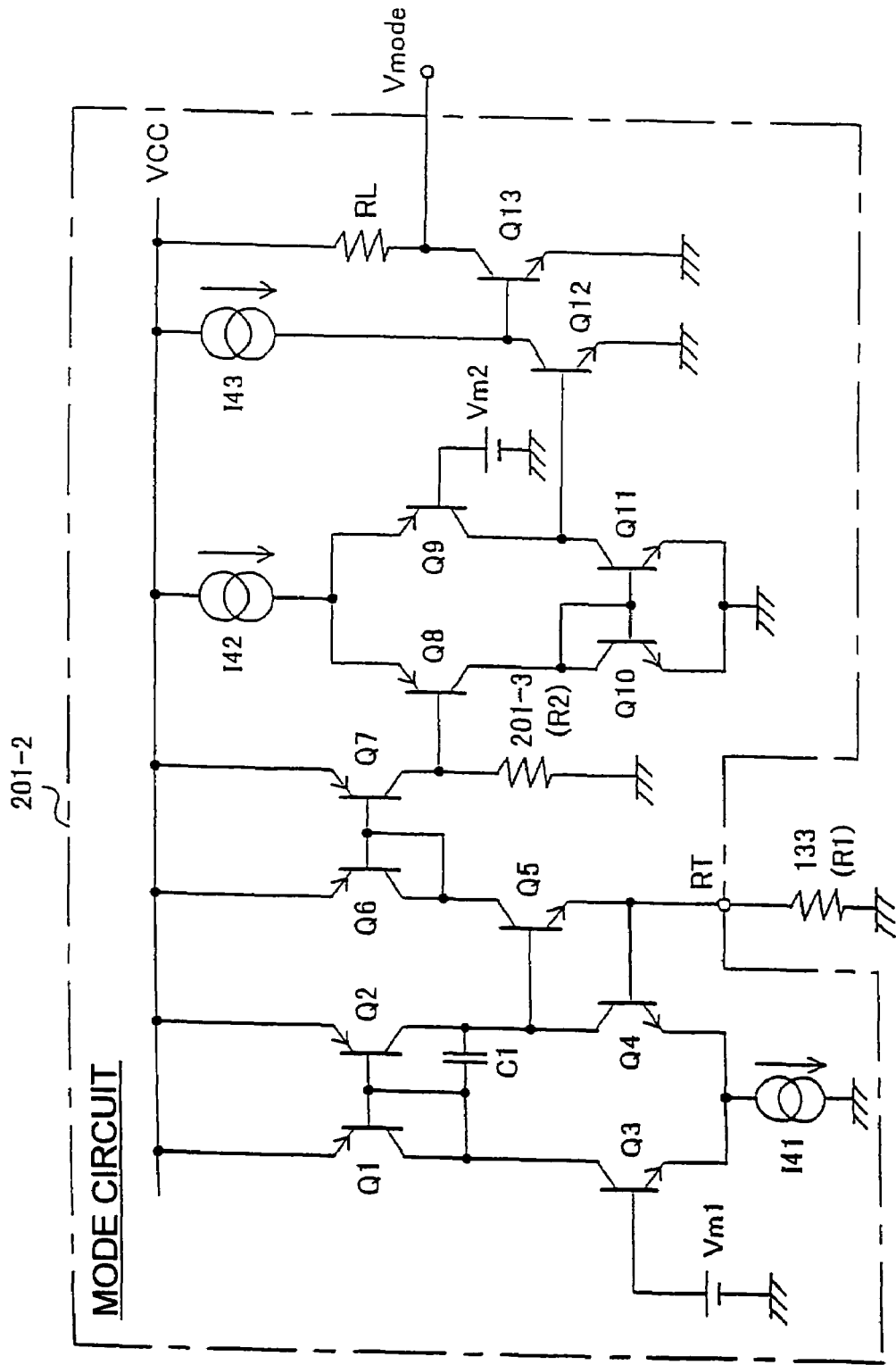
FIG. 5 shows an exemplary mode circuit contained in an oscillation block OSC of FIG. 4.

Referring to FIGS. 3–5, the structure and operation of the parallel operating system of inverters will now be described. FIG. 3 shows an arrangement of the entire parallel operating system of the inverters in accordance with an embodiment of the invention. FIG. 4 shows a partial circuit diagram of inverters of FIG. 3 in parallel operation, useful in describing connections of the inverters. FIG. 5 shows an exemplary configuration of a mode circuit of an oscillator block OSC shown in FIG. 4.

As shown in FIG. 3, a multiplicity of inverters 100A–100N are respectively arranged in proximity of a multiplicity of cold cathode fluorescent lights FLA–FLN, and operated in parallel. However, more than one cold cathode fluorescent light may be associated with one inverter. In this case, the transformer TR of FIG. 1 is provided with a multiplicity of secondary windings, from which electric power is supplied to the respective cold cathode fluorescent lights FL. Alternatively, the controller IC 200 of FIG. 1 may be provided with a multiplicity of PWM control circuits to supply multiple PWM drive signals.

Each of the controller ICs 200A–200N shown in FIG. 4 associated with the respective inverters 100A–100N are the same in structure. In what follows, therefore, only one controller IC 200A will be described in detail.

An oscillator block 201 includes an oscillator circuit 201-1 and a mode circuit 201-2. The oscillator circuit 201-1 has a first signal line connected to the external terminal 3P for outputting a PWM triangular wave signal CT, and a second signal line connected to the external terminal 4P. The oscillator circuit 201-1 also has a third signal line for outputting a clock signal S1 (or CLK) having the same frequency as, and synchronized with, the PWM triangular wave signal CT. The third signal line is connected to a logic circuit 203 and the external terminal 14P. The oscillator circuit 201-1 is supplied with a mode output Vmode of the mode circuit 201-2. The oscillator circuit 201-1 is controlled by the mode output Vmode to continue or stop its oscillation depending on the level of the mode output Vmode being H level or L level.

The mode circuit 201-2 is also connected to the external terminal 4P, as the second signal line of the oscillator circuit 201-1. The mode output Vmode of the mode circuit 201-2 is pulled up to H level when the external terminal 4P is connected to the frequency determination resistor 133 for determining the frequency of the triangular wave signal CT and the startup resistor 134, but otherwise remains at L level. The mode output Vmode is supplied to the oscillator circuit 201-1 and logic block 203.

Upon receipt of a clock signal CLK, the logic block 203 forms a stepped-down synchronization signal S2 (or TG) that is obtained by frequency-dividing the clock signal CLK by 2 when the mode output Vmode is high (H level), and outputs the signal S2 to the external terminal 13P. However, when the mode output Vmode is at L level, the synchronization signal TG is not formed. In this case, a synchronization signal TG is externally supplied to the logic block 203 together with the clock signal CLK. Thus, a predetermined logic operation is performed in the logic block 203.

The comparator 216 compares the potential STB of external terminal 11P with the reference voltage Vref5 to keep the NMOS 246 turned on until the potential STB reaches the reference voltage Vref5 and fixes the external terminal 6P at the ground potential. When the potential STB exceeds the reference voltage Vref5 subsequently, the NMOS 246 is turned off.

The comparator 217 compares the potential STB of the external terminal 11P with the reference voltage Vref6 to keep the controller IC 200A turned on while the potential STB exceeds the reference voltage Vref6. Conversely, while the potential STB is lower than the reference voltage Vref6, the controller IC 200A is turned off (the condition referred to as system-off state). The reference voltage Vref6 is set to a level lower than the reference voltage Vref5.

In the controller IC 200A–200N thus constructed, the external terminals 3P, 11P, 13P, and 14P of one controller IC are connected to the corresponding terminals of other controller IC.

When the controller IC 200A is selected as a primary controller, the frequency setting capacitor 132 is connected between the external terminal 3P of the controller IC 200A and the ground; the frequency determination resistor 133 between the external terminal 4P and the ground; and the startup resistor 134 between the external terminals 4P and 6P. In addition, the capacitor 142 is connected between the external terminal 11P and the ground, and the startup signal ST is supplied to the terminal 11P via the resistor 143. These resistors 133 and 134 and the capacitor 132 are not connected to the rest of the controller ICs (referred to as sub-controller ICs) 200B–200N.

FIG. 5 shows an exemplary internal structure of the mode circuit 201-2. PNPs Q1, Q2, Q6–Q9 and NPNs Q3–Q5, Q10–Q13, a capacitor C1, current sources I41–I43, output resistor RL, and a mode detection setting resistors 201-3 (having resistance R2) are connected as shown in FIG. 5. A comparison voltage Vm1 is impressed on the base of the NPN Q3, and the comparison voltage Vm2 on the base of the PNP Q9.

When the frequency determination resistor 133 is connected to the external terminal 4P, the mode output Vmode is pulled to H level. The startup resistor 134 is always connected to the external terminal 4P together with the frequency determination resistor 133. Further details of the starting resistor 134 will be omitted.

On the other hand, when the frequency determination resistor 133 is not connected to the external terminal 4P, the mode output Vmode remains at L level. The magnitudes of the resistor R2, comparison voltage Vm1, and comparison voltage Vm2 are set in relation to the magnitude R1 of the frequency determination resistor 133 connected to the external terminal 4P such that the mode output Vmode is pulled up or down as described above.

As an example, magnitudes of the respective resistors and voltages are set to satisfy the following inequality condition:

comparison voltage $Vm2 < \{(\text{resistance } R2/\text{resistance } R1) \times \text{comparison voltage } Vm1\}$ when the frequency determination resistor 133 is connected. This condition ensures that the mode output Vmode is pulled to H level. Conversely, when the frequency determination resistor 133 is not connected, the inequality sign is reversed since the resistance R1 then becomes infinitely large. Then the mode output Vmode is pulled to L level.

Parallel operation of the inverters will now be described.

As the startup signal ST is set at H level, the potential STB of the external terminals 11P of the respective controller ICs 200A–200N rise in accord with a time constant determined by the capacitor 142 and resistor 143. If the potential STB exceeds the reference voltage Vref6, the output level of the comparator 217 goes down from H level to L level, turning on the respective controller ICs 200A–200N (establishing system-on state). In this system-on state, all the circuits and blocks of the respective controller ICs are supplied with the power supply voltage. It is noted that in the system-off state, the power supply voltage is supplied to the comparator 217 to start up the controller IC, but not to other circuits or blocks. That is, the system is in a standby state.

When brought to the system-on state, the mode circuit 201-2 of the primary controller IC 200A generates an H level mode output Vmode. The oscillator circuit 201-1 of the primary controller IC 200A generates a PWM triangular wave signal CT and the clock signal CLK having a relatively high frequency for use at the time of startup. The frequency is determined by the frequency determination capacitor 132, frequency determination resistor 133, and starting resistor 134. In the logic block 203, a synchronization signal TG is generated based on the clock signal CLK.

Sub-controller ICs 200B–200N are turned on substantially simultaneously with the primary controller IC 200A. However, since the external terminals 4P of the sub-controller ICs 200B–200N are not connected to the frequency determination resistor 133 nor starting resistor 134, none of PWM triangular wave signal CT, clock signal CLK, and synchronization signal TG is not generated in the sub-controller ICs.

The PWM triangular wave signal CT, clock signal CLK, and synchronization signal TG generated in the primary controller IC 200A are supplied to the respective sub-controller ICs 200B–200N connected thereto. In each of the sub-controller ICs 200B–200N, a PWM control signal is generated based on the given PWM triangular wave signal CT, clock signal CLK, and synchronization signal TG supplied from the primary controller IC 200A.

Since those inverters associated with the sub-controller ICs (referred to as sub-inverters) operate in synchronism with the main inverter having the primary controller IC 200A, all the inverters operate in phase. The inverters are arranged in close proximity of the respective distributed CCFLs (backlight sources of the LCD).

Thus, the multiple CCFLs synchronously emit beams of light that interfere each other, preventing flickers. It will be appreciated that since the inverters are arranged close to the respective CCFLs, undesired influence of high-voltage wiring lines to other components is reduced. Moreover, parasitic capacitances of the CCFLs can be effectively used for resonance thereof with the inductance of the transformer.

By the time the potential STB of the external terminal 11P reaches the reference voltage Vref5, the NMOS 246 is turned on and the startup resistor 134 becomes connected in parallel with the frequency determination resistor 133. As a consequence, the PWM triangular wave signal CT, the clock signal CLK, and synchronization signal TG are generated with a higher frequency than that of normal operating frequency. This in turn causes the output frequency of the inverter circuits to be raised during a startup, which is effective to turn on the CCFLs.

As the potential STB of the external terminal 11P exceeds the reference voltage Vref5, the output of the comparator 216 is inverted from H level to L level, and the NMOS 246 will turn off, causing the system to enter normal operation. The period of time for the startup signal ST to rise and enter the normal operation is preferably longer than the time for any of the CCFLs to turn on, in view of the fact that such period fluctuates from one CCFL to another. Normal operation is essentially the same as the startup operation in that the multiple inverters are synchronized with the PWM triangular wave signal CT, clock signal CLK, and the synchronization signal TG, and differs only in that the synchronization frequency of the normal operation is the same as the normal operating frequency.

It will be recalled that in the example shown above all the external terminals 11P of the controller ICs 200A–200N are connected together so that all of the controller ICs, and hence the inverters, can be started up and stopped by the common startup signal ST. Alternatively, the startup signal ST may be provided to each of the controller ICs or to a group of controller ICs, thereby allowing the inverters to be started up and stopped individually or in groups. It will be apparent that in that case too, synchronous operation of the inverters can be effected without any difficulty.

In the example shown above, the clock signal CLK is shown to have the same frequency as the PWM triangular wave signal CT and synchronized therewith. However, the clock signal CLK may alternatively have a frequency that is ½ of that of the PWM triangular wave signal CT, provided that they are synchronized. In this case, the clock signal CLK turns out to be the same as the synchronization signal as described above, the controller ICs 200A–200N doubly step up the frequency of the clock signal CLK to form a new clock signal in synchronism with the PWM triangular wave signal CT. It is then possible to reduce the number of the external terminals of the controller ICs and the number of wires interconnecting the controller ICs.

INDUSTRIAL AVAILABILITY

As described above, the parallel operating system of dc-ac converters and controller ICs therefor are suitable for use in a backlight source of a liquid crystal display adapted to obtain a high ac voltage from a low dc voltage source.

The invention of claimed is:

1. A parallel operating system of operating in parallel a multiplicity (N) of dc-ac converters, each dc-ac converter comprising:
    a transformer having a primary winding and at least one secondary winding connected to a load;
    a semiconductor switch circuit for flowing current from a dc power supply to said primary winding in a first direction and a second direction alternately;
    a current detection circuit for detecting the current flowing through said load and generating a current detection signal;
    an oscillator block for generating a triangular wave signal and a clock signal synchronized with said triangular wave signal when connected to a frequency determination capacitor and a frequency determination resistor; and
    a PWM control circuit for providing said semiconductor switch circuit with a PWM-controlled switch drive signal upon receipt of said triangular wave signal, clock signal, and current detection signal, wherein said system is adapted to provide a startup signal for starting up said PWM control circuit to each group of dc-ac converters including at least one dc-ac converter.

2. A controller IC for controlling the ac power to be supplied to a load by driving a semiconductor switch circuit, said controller IC comprising:
    an oscillator block for generating a triangular wave signal and a clock signal synchronized with said triangular wave signal when connected to a frequency determination capacitor and a frequency determination resistor;
    a PWM control circuit for providing said semiconductor switch circuit with a PWM-controlled switch drive signal upon receipt of said triangular wave signal and clock signal and the current detection signal obtained by detecting the current flowing through said load;
    a first external terminal connected to said frequency determination capacitor and adapted to serve as an output terminal when said triangular wave signal is generated, but serve as an input terminal for receiving an external triangular wave signal when said triangular wave signal is not generated;
    a second external terminal connected to said frequency determination resistor;
    a third external terminal adapted to serve as an output terminal when said clock signal is generated, but serve as an input terminal when said clock signal is not generated; and
    a fourth external terminal adapted to serve as an input terminal of a startup signal for starting up said PWM control circuit, wherein
    said triangular wave signal is also outputted from said first external terminal and said clock signal is outputted from said third external terminal when said frequency determination capacitor is connected to said first external terminal and said frequency determination resistor is connected to said second external terminal;
    said triangular wave signal is externally inputted to said first external terminal and said clock signal is externally inputted to said third external terminal when said frequency determination resistor is not connected to said external terminal; and
    said PWM control circuit is started up for PWM-controlling said semiconductor switch circuit when startup signal is inputted into said fourth external terminal.

3. The controller IC according to claim 2, further comprising a fifth external terminal, wherein
    a startup resistor for determining the startup frequency of said load is externally connected, together with said frequency determination resistor, between said fifth external terminal and second external terminal; and
    connection of said startup resistor to said fifth external terminal is controlled by an internal switch so as to connect said startup resistor in parallel with said frequency determination resistor at the time of startup.

4. The controller IC according to claim 2 or 3, further comprising a sixth external terminal, wherein
　　said triangular wave signal and said clock signal generated in said oscillator block have the same frequency;
　　a synchronization signal is generated by stepping down said clock signal and said clock signal is outputted from said sixth terminal when said triangular wave signal is generated in said oscillator block; and
　　said resultant clock signal is externally inputted to said sixth external terminal when said triangular wave signal is not generated in said oscillator block.

5. The controller IC according to claim 2, wherein said oscillator block comprises:
　　a mode circuit for determining whether said frequency determining resistor is connected thereto or not and outputting the determination; and
　　an oscillation circuit that is enabled or disabled in accordance with the determination received from said mode circuit.

* * * * *